(12) United States Patent
Jung et al.

(10) Patent No.: US 11,775,820 B2
(45) Date of Patent: Oct. 3, 2023

(54) INFORMATION SHARING PLATFORM AND METHOD CAPABLE OF PROVIDING BIDIRECTIONAL VEHICLE STATE INFORMATION AND SYSTEM HAVING INFORMATION SHARING PLATFORM

(71) Applicants: HYUNDAI MOTOR COMPANY, Seoul (KR); KIA MOTORS CORPORATION, Seoul (KR)

(72) Inventors: In-Soo Jung, Goyang-si (KR); Dong-Chul Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 550 days.

(21) Appl. No.: 16/880,738

(22) Filed: May 21, 2020

(65) Prior Publication Data
US 2021/0182669 A1    Jun. 17, 2021

(30) Foreign Application Priority Data
Dec. 11, 2019   (KR) .......................... 10-2019-0164634

(51) Int. Cl.
*G06N 3/08*    (2023.01)
*G06F 9/38*    (2018.01)
(Continued)

(52) U.S. Cl.
CPC .............. *G06N 3/08* (2013.01); *G06F 9/3836* (2013.01); *G06N 3/044* (2023.01); *G06N 3/045* (2023.01);
(Continued)

(58) Field of Classification Search
CPC ........ G06N 3/08; G06N 3/0635; G06N 3/084; G06N 3/082; G06N 3/0445; G06N 3/0454; G06N 3/06; G06F 9/3836; G06F 16/176; G06F 16/3331; H04L 12/40; H04L 2012/40215; H04L 2012/40273; B60R 16/0232; G06Q 10/20; G06Q 50/30; G07C 5/008; G07C 5/0808; B60W 50/0205
See application file for complete search history.

(56) References Cited

U.S. PATENT DOCUMENTS 10,728,461 B1 *  7/2020  Kim .......................... G06T 7/80
2016/0364922 A1 * 12/2016  Sahinoglu ............... G01S 19/42
(Continued)

FOREIGN PATENT DOCUMENTS

| DE | 102017221701 A1 | 4/2019 |
| KR | 10-2018-0029543 A | 3/2018 |
| KR | 10-2019-0042203 A | 4/2019 |

*Primary Examiner* — Asghar H Bilgrami
(74) *Attorney, Agent, or Firm* — Fox Rothschild LLP

(57) ABSTRACT

An information sharing platform of providing bidirectional vehicle state information between a driver and a vehicle, the information sharing platform may include a communication controller which collects measured data and vehicle Controller Area Network (CAN) information by sensors installed to components capable of diagnosing a vehicle state; and a graphic controller which provides a driver with diagnosis result output information that is generated based on a predetermined selection criterion among the components through Deep Learning based diagnosis using big data having the collected data.

18 Claims, 10 Drawing Sheets

(51) Int. Cl.

| | |
|---|---|
| *H04L 12/40* | (2006.01) |
| *H04L 12/42* | (2006.01) |
| *B60R 16/023* | (2006.01) |
| *G06F 16/176* | (2019.01) |
| *G06F 16/33* | (2019.01) |
| *G07C 5/00* | (2006.01) |
| *G06N 3/06* | (2006.01) |
| *G06Q 50/30* | (2012.01) |
| *G07C 5/08* | (2006.01) |
| *G06N 3/065* | (2023.01) |
| *G06N 3/044* | (2023.01) |
| *G06N 3/045* | (2023.01) |
| *G06N 3/084* | (2023.01) |
| *G06Q 10/20* | (2023.01) |
| *G06N 3/082* | (2023.01) |

(52) U.S. Cl.
CPC ............... *G06N 3/06* (2013.01); *G06N 3/065* (2023.01); *G06N 3/084* (2013.01); *G06Q 10/20* (2013.01); *G06Q 50/30* (2013.01); *G07C 5/0808* (2013.01); *H04L 12/40* (2013.01); *G06N 3/082* (2013.01); *H04L 2012/40215* (2013.01)

(56) References Cited

U.S. PATENT DOCUMENTS

| | | | |
|---|---|---|---|
| 2018/0182187 A1* | 6/2018 | Tong | ................. G06V 10/80 |
| 2019/0114849 A1 | 4/2019 | Lee et al. | |
| 2021/0094553 A1* | 4/2021 | Lee | ................. G06K 9/00536 |
| 2021/0108926 A1* | 4/2021 | Tran | ................. G06N 3/04 |
| 2022/0126864 A1* | 4/2022 | Moustafa | ............ B60W 60/001 |

* cited by examiner

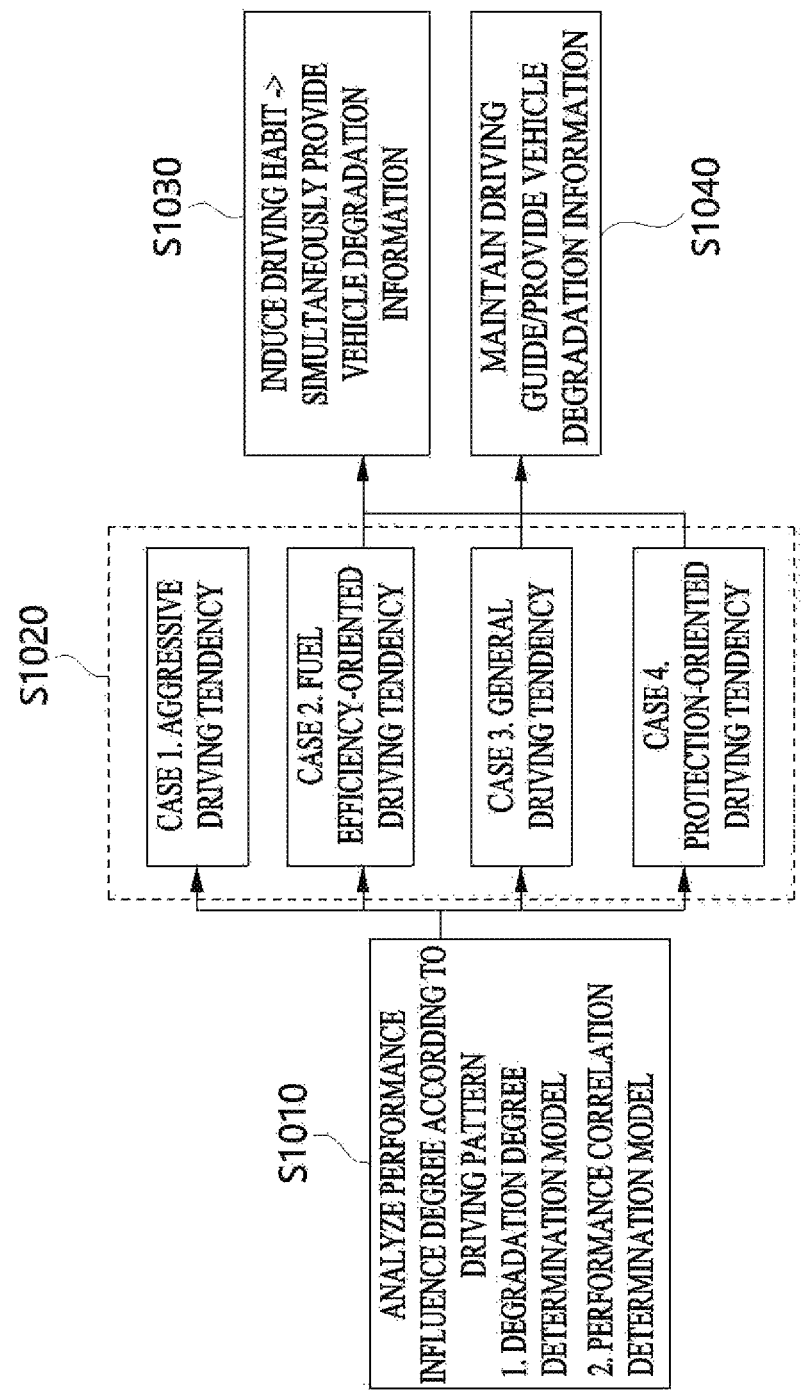

INFORMATION SHARING PLATFORM AND METHOD CAPABLE OF PROVIDING BIDIRECTIONAL VEHICLE STATE INFORMATION AND SYSTEM HAVING INFORMATION SHARING PLATFORM

CROSS-REFERENCE TO RELATED APPLICATION

The present application claims priority to and the benefit of Korean Patent Application No. 10-2019-0164634, filed on Dec. 11, 2019, which is incorporated herein by reference in its entirety.

TECHNICAL FIELD

The present disclosure relates to a vehicle driving technology, and more particularly, to an information sharing platform and method of providing bidirectional vehicle state information.

BACKGROUND

The statements in this section merely provide background information related to the present disclosure and may not constitute prior art.

A technology of diagnosing a problem occurring during running of a vehicle and providing information for solving the problem has been proposed. To this end, a location-based service, a basic control service, and a regular vehicle check related schedule alarm are provided.

In this case, a driver needs to determine the problem by himself/herself and to make a reservation for a check and directly visit a service center. The visit to the service center can result in the vehicle repairs and costs by executing abnormal state precise diagnosis even in a simple problem. Accordingly, the customer satisfaction may be lowered when dissatisfaction to the repairs occurs.

In addition, it may not be possible to provide the management service due to the limited information and vehicle state diagnosis.

SUMMARY

The present disclosure provides an information sharing platform and method of providing bidirectional vehicle state information, which can implement a Deep Learning algorithm using big data for each type collected through vibration and noise signals for diagnosing the state of a vehicle.

In addition, the present disclosure provides an information sharing platform and method capable of providing bidirectional vehicle state information, which enable the bidirectional communication between a driver and a vehicle, which provide the current vehicle state diagnosis and vehicle running related prediction information and provide the knowledge of a vehicle expert, configured as big data, for the customer's inquiries about the vehicle.

In addition, the present disclosure provides an information sharing platform and method capable of providing bidirectional vehicle state information, which can periodically learn the driving habits and the running pattern of the driver, such as the main use road, to provide an efficient driving pattern guide to the customer based on the data obtained by the learning.

In addition, the present disclosure provides an information sharing platform and method capable of providing bidirectional vehicle state information, which can provide immediate and accurate information on the driver's voice inquiries by configuring, as a DB, the management manual and maintenance of the mass-produced vehicles or the setting related data of the vehicle.

The present disclosure provides an information sharing platform capable of providing bidirectional vehicle state information, which can implement a Deep Learning algorithm using big data for each type collected through vibration and noise signals for diagnosing the state of a vehicle.

The information sharing platform capable of providing bidirectional vehicle state information includes
a communication controller which collects measured data and vehicle Controller Area Network (CAN) information by sensors installed to components capable of diagnosing a vehicle state; and
a graphic controller which provides a driver with diagnosis result output information generated based on a predetermined selection criterion among the components through Deep Learning based diagnosis based on big data composed of the collected data.

In addition, the selection criterion is set for each rank by comparing at least one of vibration data and noise data of the measured data with each other.

In addition, the diagnosis result output information includes a corresponding component and abnormal probability value.

In addition, the graphic controller generates driving tendency analysis information classifying the driver's tendency based on running pattern data of the driver.

In addition, the driving tendency analysis information classifies the driver's tendency into a fuel efficiency type or a power performance type by comparing a current diagnosis result with a previous diagnosis result.

In addition, the Deep Learning based diagnosis includes a bidirectional Gated Recurrent Unit (GRU), a Deep Neural Network (DNN), and an Attention mechanism.

In addition, the Deep Learning based diagnosis is executed when an execution instruction of the driver is input by voice or text.

In addition, the graphic controller includes a plurality of artificial intelligence modules so that the corresponding Deep Learning based diagnosis is executed according to the classification of the execution instruction.

In addition, the plurality of artificial intelligence modules are set by being matched in advance with the classification of the execution instruction.

In addition, the execution instruction is re-input when the accuracy of confirming a specific-rank execution instruction among the execution instructions is a predetermined accuracy or less.

On the one hand, the present disclosure provides a big data based state diagnosis information providing system including: the aforementioned information sharing platform which is capable of providing the bidirectional vehicle state information between the driver and the vehicle; a central server which is connected to the information sharing platform by a communication network and stores, as a database, and provides answer information according to an inquiry type input by the driver; and at least one communication terminal which inputs the answer information.

At this time, the inquiry type is any one among vehicle manual related information, current vehicle state related information, and technical knowledge information.

On the other hand, the present disclosure provides an information sharing method capable of providing bidirectional vehicle state information between a driver and a vehicle including collecting, by a communication controller, measured data and vehicle Controller Area Network (CAN) information by sensors of components;

executing, by a graphic controller, Deep Learning based diagnosis based on big data composed of the collected data; and providing, by the graphic controller, a driver with diagnosis result output information generated by a predetermined selection criterion among the components by executing the Deep Learning based diagnosis.

According to the present disclosure, the Deep Learning based problematic noise source diagnosis technology, which is an existing proposed technology, can be extended to the use for storing and predicting diagnosis record information. That is, it is possible to store the diagnosis results (periodic diagnosis per mileage) of the problematic noise/vibration source according to the diagnosis item/problematic degree level/change amount and the like. In addition, it is possible to provide the service cycle notification and the deterioration degree of the problematic components as the prediction results by using the data information accumulated periodically.

In addition, it is possible to provide a Text Mining based vehicle knowledge service technology. That is, it is possible to configure, as a database, and store (including update) the entire manual (vehicle function, maintenance, setting, and the like) of the mass-produced vehicles. In addition, it is possible to construct the inquiry input device of the vehicle by a method such as voice recognition+text input. In addition, it is possible to search for the optimal answer using the Text Mining (Deep Learning technique) and to provide the optimal answer to the driver by voice, text or the like.

In addition, it is possible to provide the vehicle knowledge service technology specialized for the state diagnosis results of the vehicle including the vehicle body/Power Train (PT). That is, it is possible to provide the diagnosis results by the technology when inputting the diagnosis instruction on the noise, vibration, harshness (NVH) characteristics felt by the driver during running.

In addition, it is possible to provide the service which feeds back the accurate state information of the current symptom by playing back the normal state NVH data and the abnormal state NVH data of the components diagnosed through the development database of the manufacturer. In addition, this is a method of outputting the representative value of the training data used for the problematic noise/vibration diagnosis, and providing the data measured from the currently running vehicle, which can include the method of outputting the representative value through the audio or displaying the analysis data.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 10 is a conceptual diagram showing a process of providing guidance information by analyzing Deep Learning based running pattern learning in one form of the present disclosure.

Figure 1:
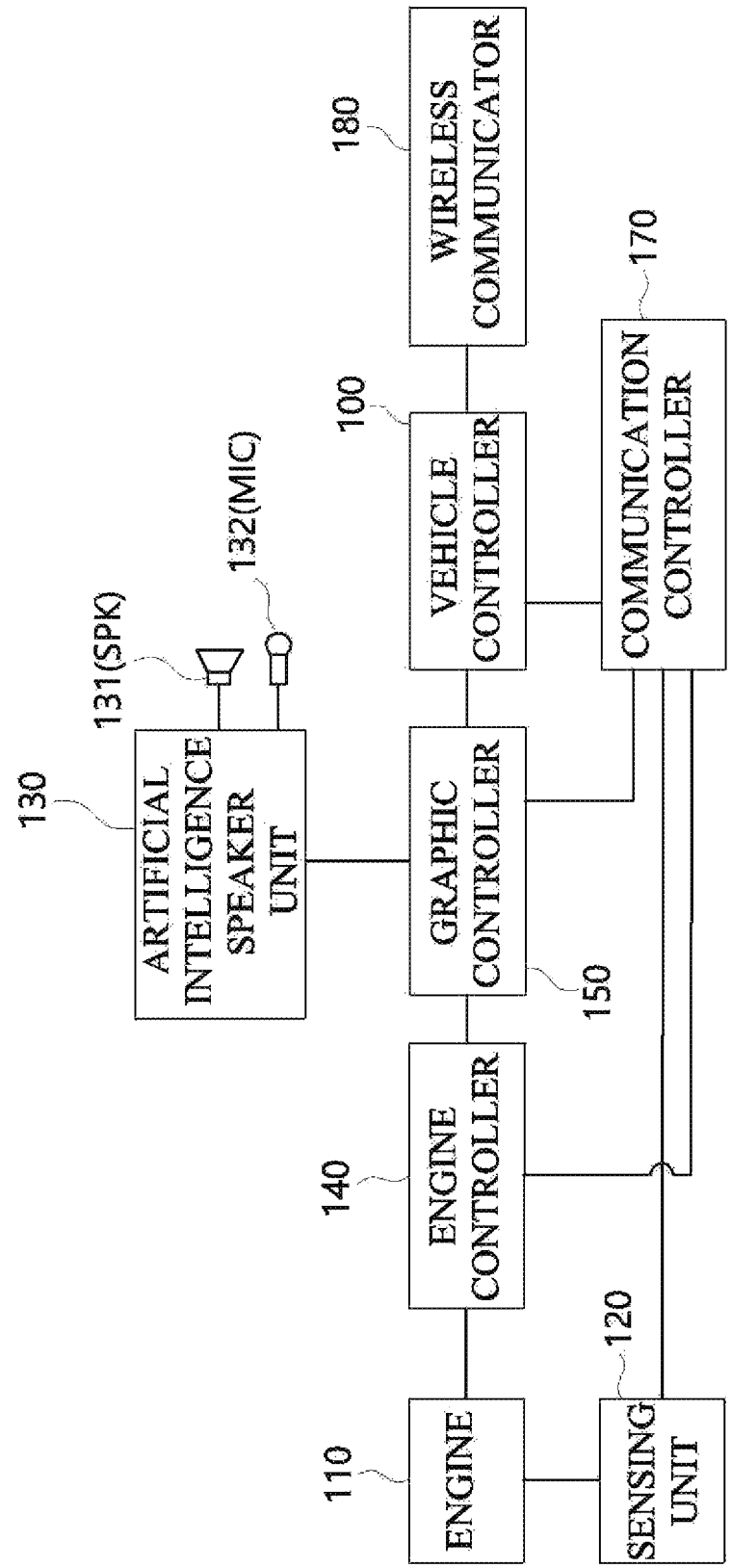
FIG. 1 is a block diagram showing a configuration of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals are used for like elements in describing each drawing. The terms "first", "second", and the like can be used to describe various components, but the components should not be limited by the terms. The terms are used to differentiate one element from another.

For example, a first component can be referred to as a second component, and similarly, the second component can be also referred to as the first component without departing from the scope of the present disclosure. The terms "and/or" includes a combination of a plurality of related listed items or any item of a plurality of related listed items.

Unless otherwise defined, all terms including technical and scientific terms used herein have the same meaning as commonly understood by those skilled in the art to which the present disclosure pertains.

It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, a big data based state diagnosis information providing system and method in some forms of the present disclosure will be described in detail with reference to the accompanying drawings.

FIG. 1 is a block diagram showing a configuration of a vehicle 100 in some forms of the present disclosure. Referring to FIG. 1, the vehicle 100 is configured to include an engine 110, a sensing unit 120, an artificial intelligence speaker unit 130, an engine controller 140, a graphic controller 150, a vehicle controller 160, a communication controller 170, a wireless communicator 180, and the like.

The engine 110 can be Continuous Variable Valve Timing (CVVT), Double Over Head Camshaft (DOHC), Gasoline Direct Injection (GAI), and Multi Point Injection (MPI)

engines which use gasoline as fuel, Common Rail Direct Injection (CRDI), High direction Turbo Intercooler (HTI), and Variable Geometry Turbocharge (VGT) engines which use diesel as fuel, a Liquid Propane injection (LPi) engine which use gas as fuel, and the like.

The sensing unit 120 collectively refers to sensors, and performs a function of generating vibration data and noise data of a vehicle. That is, the sensing unit 120 performs a function of generating the vibration data and the noise data by installing a vibration sensor, a noise sensor, and the like to components configured in the vehicle. In addition, the sensing unit 120 generates the vibration and noise data even with respect to a Power Train (PT). The power train can be a transmission, a clutch, and the like as a series of components which deliver power.

Although the sensing unit 120 is shown in FIG. 1 separately from the engine 110 block for understanding, the sensing unit 120 can be configured by being integrated with the engine 110.

The artificial intelligence speaker unit 130 performs a function of receiving and recognizing the driver's voice and converting the driver's voice into text information to transmit the text information to the graphic controller 150. In addition, the artificial intelligence speaker unit 130 converts the answers to the driver's inquiries into a voice and provides the voice through the graphic controller 150. To this end, the artificial intelligence speaker unit 130 can be composed of a speaker 131 configured to output voice, a microphone 132 configured to receive the voice, a microprocessor, an electronic circuit, a voice recognition program, a voice text conversion program, and the like.

The engine controller 140 performs a function of controlling the output of the engine 110 under the control of the vehicle controller. In addition, the engine controller 140 generates engine control data related to the control of the engine 110.

Engine control data, in-vehicle communication message data (that is, Controller Area Network (CAN) data), environmental data, and the like can be collected through the sensing unit 120, the engine controller 140, and the like. The in-vehicle communication message data, the environmental data, and the like can be various state monitoring data of the engine. The engine data can be revolution per minute (RPM), cylinder information, displacement, and the like as data related to the engine.

The engine control data are data related to the control of the engine, and can be coolant temperature, oil temperature, air temperature, combustion pressure, and the like. The in-vehicle communication message data are data related to not only a control closely related to the running such as an engine, a transmission, an Anti-lock Brake System (ABS) (not shown), an active suspension (not shown), and shifting, but also a control of an auxiliary device of the vehicle such as a mirror adjuster (not shown), a sunroof (not shown), a power window (not shown), and a seat adjuster (not shown).

The in-vehicle communication message data is a concept of including vehicle data and environmental data. Accordingly, the environmental data is data except for the vehicle data. The environmental data can be operation information of an air conditioner, state information of a door, and the like.

Further referring to FIG. 1, in particular, the sensing unit 120 measures noise, vibration, harshness (NVH) in an engine room and a vehicle interior.

The graphic controller 150 includes a Graphics Processing Unit (GPU) and the like, and performs diagnosis and prediction through Deep Learning based on big data. That is, the graphic controller 150 performs a function of diagnosing the abnormal state through Deep Learning based on the big data composed of various abnormal noise and vibration data. In addition, the graphic controller 150 performs a function of receiving document information through the knowledge search for a corresponding abnormal state, diagnosed by classifying the big data, to provide the document information to the driver.

In order to perform such Deep Learning, the graphic controller 150 can include a Graphics Processing Unit (GPU). Thousands to tens of thousands of Arithmetic Logic Unit cores are disposed in the GPU. Accordingly, simultaneous parallel processing is possible.

The vehicle controller 160 performs a function of controlling components for controlling the vehicle. In particular, the vehicle controller 160 can acquire engine information from the engine controller 140 configured to control the engine (not shown) through the graphic controller 150. The engine information can be an engine revolution per minute (RPM), an engine start-up, an idle state, and the like. The vehicle controller 160 can be an Electronic Control Unit (ECU), a Hybrid Control Unit (HCU), or the like. Although only the engine has been shown in FIG. 1, both the engine and a motor (not shown) can also be configured or only the motor can be configured. If the motor is configured, a motor controller (not shown) configured to control the motor can be configured. The motor controller can be configured to include an inverter, a converter, and the like to control the motor.

The communication controller 170 performs a function of controlling the communication between components in the vehicle. The communication between the components is connected by Multimedia-Controller Area Network (MM-CAN), Body-Controller Area Network (B-CAN), and high-speed Controller Area Network (CAN) communication lines (for example, 500 kbps), a CAN-Flexible Data-Rate (CAN-FD) communication line, a Flexlay communication line, a Local Interconnect Network (LIN) communication line, a Power Line Communication (PLC) communication line, a Control Pilot (CP) communication line, or the like so that an upper controller delivers instructions to a lower controller while the controllers exchange information therebetween.

The wireless communicator 180 performs a function of transmitting data to the outside or receiving data from the outside. To this end, the wireless communicator 180 can be configured to include a microprocessor, a communication circuit, and the like. Of course, although only the wireless communicator 180 has been shown, wired communication is also possible.

In addition, although a memory has not been shown in FIG. 1, the memory can be configured. The memory can include at least one type of storage medium among a flash memory type, a hard disk type, a multimedia card micro type, a card type memory (for example, Secure Digital (SD) or eXtreme Digital (XD) memory, or the like), a Random Access Memory (RAM), a Static Random Access Memory (SRAM), a Read Only Memory (ROM), an Electrically Erasable and Programmable Read Only Memory (EEPROM), a Programmable Read Only Memory (PROM), a magnetic memory, a magnetic disk, and an optical disk.

Figure 2:
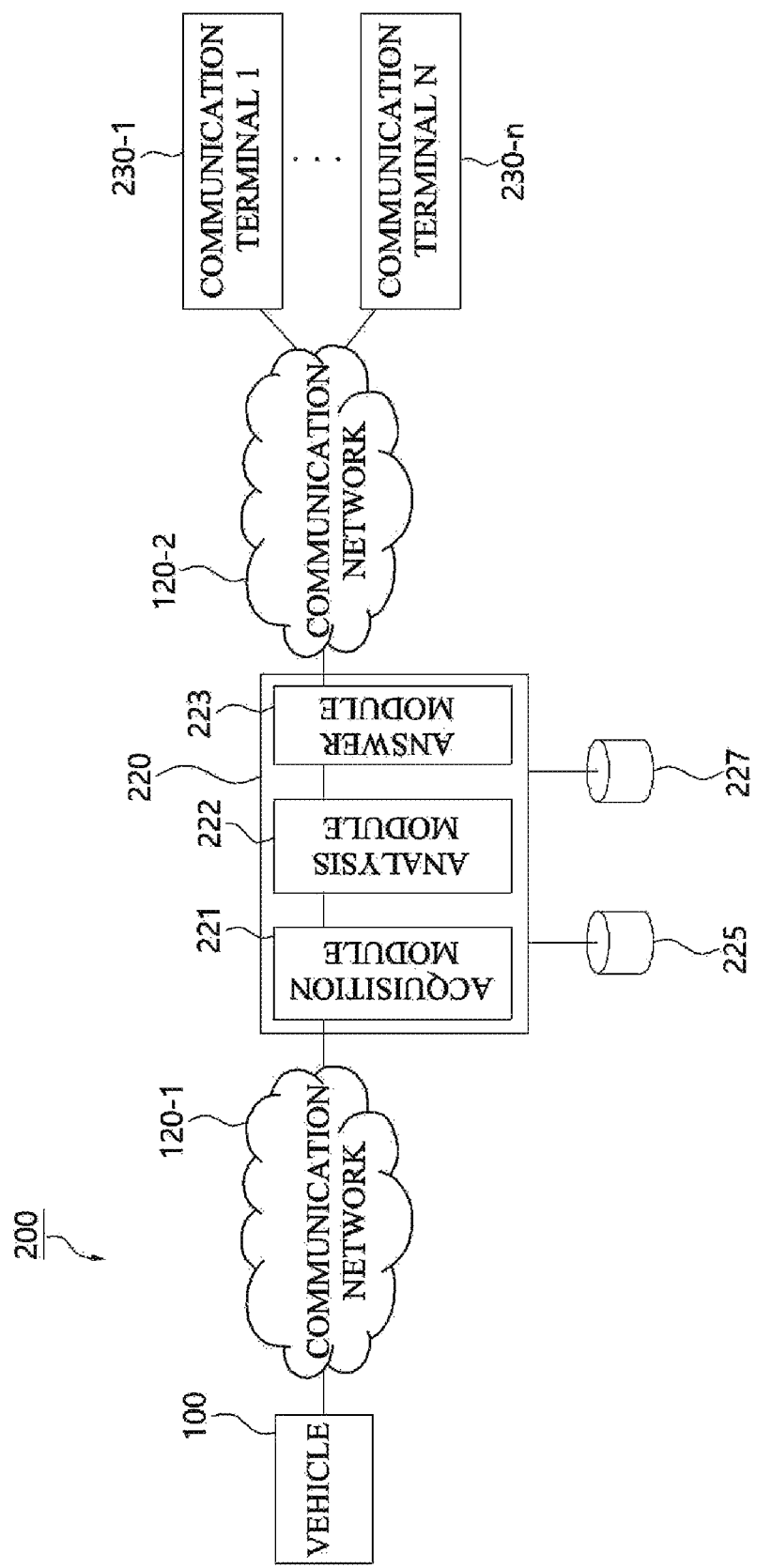
FIG. 2 is a block diagram showing a configuration of a big data based state diagnosis information providing system in one form of the present disclosure.

FIG. 2 is a block diagram showing a configuration of a big data based state diagnosis information providing system 200 in some forms of the present disclosure. Referring to FIG. 2, the big data based state diagnosis information providing system 200 can be composed of the vehicle 100, first and second communication networks 210-1, 210-2, a central server 220, first to $n^{th}$ communication terminals 230-1 to 230-$n$, and the like. The wireless communicator 180 of the vehicle 100 can be communicatively connected to the central server 220 through the first communication network 210-1. In addition, the first to $n^{th}$ communication terminals 230-1 to 230-$n$ can be communicatively connected to the central server 220 through the second communication network 210-2.

The first and second communication networks 210-1, 210-2 mean a connection structure capable of exchanging information between the respective nodes such as a plurality of terminals and servers, and can be a public switched telephone network (PSTN), a public switched data network (PSDN), an Integrated Services Digital Networks (ISDN), a Broadband ISDN (BISDN), a Local Area Network (LAN), a Metropolitan Area Network (MAN), a Wide LAN (WLAN), or the like.

However, the present disclosure is not limited thereto, and t first and second communication networks 210-1, 210-2 can be a Code Division Multiple Access (CDMA), a Wideband Code Division Multiple Access (WCDMA), a Wireless Broadband (Wibro), Wireless Fidelity (WiFi), a High Speed Downlink Packet Access (HSDPA) network, Bluetooth, a Near Field Communication (NFC) network, a satellite broadcasting network, an analog broadcasting network, a Digital Multimedia Broadcasting (DMB) network, and the like which are the wireless communication networks. Alternatively, the first and second communication networks 210-1, 210-2 can be a combination of these wired communication networks and wireless communication networks.

The central server 220 can be configured to include an acquisition module 221, an analysis module 222, an answer module 223, and the like. The acquisition module 221 performs a function of acquiring a diagnosis result or vehicle related knowledge inquiry information, generated in the vehicle 100 through the graphic controller 150 and/or the artificial intelligence speaker 130, through the first communication network 210-1.

The analysis module 222 performs a function of analyzing the diagnosis result information or the knowledge inquiry information.

The answer module 223 performs a function of generating and transmitting answer information to the vehicle 100 side by matching the analysis information generated by the analysis module 222 with the answer knowledge big data. The answer knowledge big data is stored in a first database 225. Of course, the first database 225 is a place where the technical experts store the answers to the inquiries by using the first to $n^{th}$ communication terminals 230-1 to 230-$n$. In addition, the first database 225 can include manual information for each vehicle, manual information for each component, and the like.

A second database 227 stores vehicle information, driver information, and the like about the vehicle. The driver information can be a name, a telephone number, an address, and the like, and the vehicle information can be a Vehicle Identification Number (VIN), a production year, a vehicle type, an engine type, and the like.

Although FIG. 2 shows that the first database 225 and the second database 227 are separately configured, this is for understanding and the first database 225 and the second database 227 can be configured as one database. In addition, the first database 225 and the second database 227 can also be configured in the central server 220, and can also be configured as a separate database server.

The first to $n^{th}$ communication terminals 230-1 to 230-$n$ are terminals owned by a technical expert, and can be a mobile phone, a smart phone, a laptop computer, a digital broadcasting terminal, a Personal Digital Assistants (PDA), a Portable Multimedia Player (PMP), a navigation system, a note pad, and the like. Accordingly, the technical expert can create the answer information by sharing the driver demand information about the vehicle through the first to $n^{th}$ communication terminals 230-1 to 230-$n$. The driver demand information can be a technical inquiry, a manual inquiry, or the like.

Figure 3:
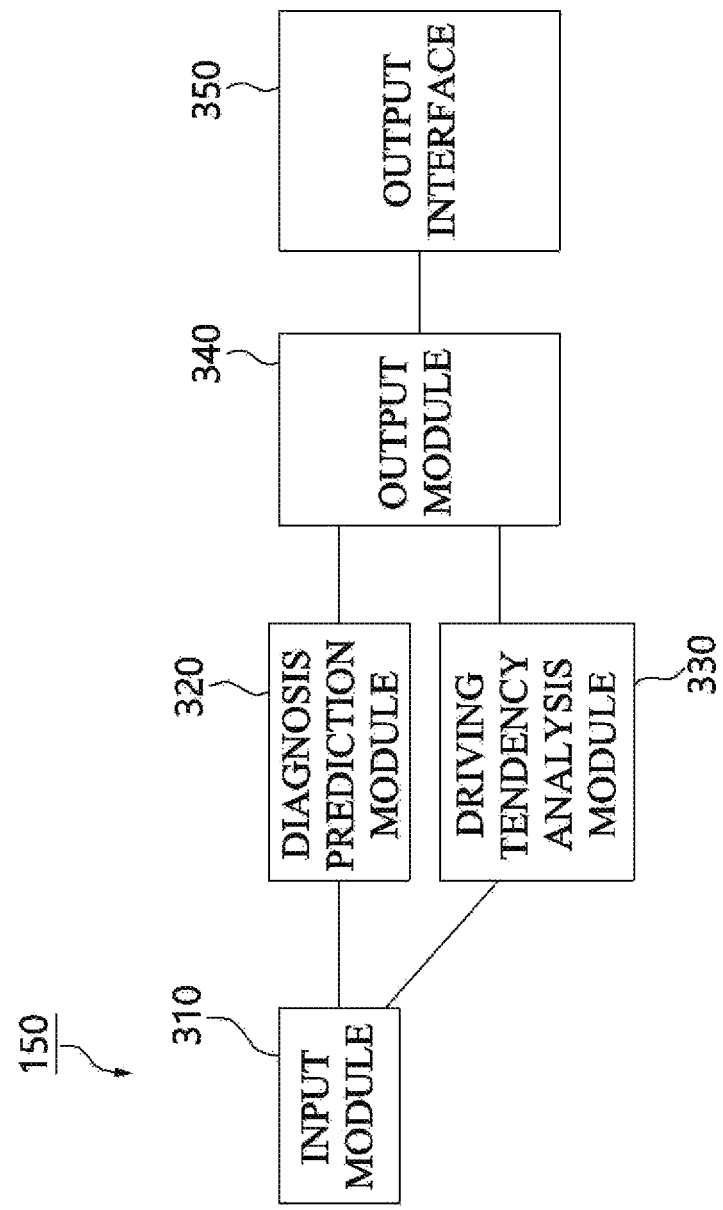
FIG. 3 is a block diagram showing a detailed configuration of a graphic controller shown in FIG. 1.

FIG. 3 is a block diagram of a detailed configuration of the graphic controller 150 shown in FIG. 1. Referring to FIG. 3, the graphic controller 150 can be configured to include an input module 310, a diagnosis prediction module 320, a driving tendency analysis module 330, an output module 340, an output interface 350, and the like. The input module 310 performs a function of collecting data generated by the sensing unit 120 and the engine controller 140. That is, the input module 310 collects vibration data, noise data, in-vehicle communication message data, and the like to generate big data. In addition, the input module 310 can additionally collect running pattern data of the driver, road data, traffic data, and the like. The running pattern data can include a safety distance, speeding, sudden acceleration, sudden deceleration, sudden stop, sudden start, and the like. The road data can be Global Positioning System (GPS) based road data. The traffic data represents the traffic volume. These road data and/or traffic data can be received from the GPS through the wireless communicator 180.

The diagnosis prediction module 320 performs a function of outputting three corresponding components having the largest noise and/or vibration by applying Deep Learning. For example, the diagnosis result output information can be expressed as follows.

TABLE 1

| Ranking | Corresponding component | Abnormal probability value |
| --- | --- | --- |
| First rank | Component X1 | 87.0% |
| Second rank | Component X2 | 84.3% |
| Third rank | Component X3 | 70.0% |

Of course, the top three diagnosis results in Table 1 are illustrative, and the number of diagnosis results can also be more than or less than three. In addition, additional information can be stored in the diagnosis result output information. The additional information can be a diagnosis probability value for each rank, a vibration level (dB) and a noise level (dB) for each rank, and the like. The diagnosis probability value for each rank can be a range value for each rank. For example, the first rank can be 85% to 100%, the second rank can be 75% to 84.9%, and the third rank can be 65% to 69.9%.

The driving tendency analysis module 320 performs a function of classifying the driver's tendency based on the running pattern data of the driver by using Deep Learning. That is, the tendency is classified into aggressive driving tendency, fuel efficiency-oriented driving tendency, general driving tendency, and protection-oriented driving tendency.

Further referring to FIG. 3, the output module 340 performs a function of providing the driver with guidance information corresponding to the diagnosis result output information and the driving tendency analysis information generated by the diagnosis prediction module 320 and the driving tendency analysis module 330. The guidance information can be a combination of voice, text, and graphics. That is, the voice is output through the artificial intelligence speaker unit 130, and the text and graphics are output through the output interface 350.

The output interface 350 performs a function of outputting the guidance information. To this end, a display can be configured. The display can be a Liquid Crystal Display (LCD), a Light Emitting Diode (LED) display, an Organic LED (OLED) display, a touch screen, a flexible display, a Head Up Display (HUD), or the like. Of course, the output interface 350 functions as an information input means as well as the information output means. That is, if the output interface 350 is a touch screen, the driver can also input an execution instruction by text through the touch screen.

The term "~module" described in FIGS. 2 and 3 means a unit for processing at least one function or operation, which can be implemented in software and/or hardware. In hardware implementation, it can be implemented as an application specific integrated circuit (ASIC), a digital signal processing (DSP), a programmable logic device (PLD), a field programmable gate array (FPGA), a processor, a microprocessor, and other electronic units, which are designed to perform the functions described above, or a combination thereof. In software implementation, it can include a software component (element), an object-oriented software component, a class component and a task component, a process, a function, an attribute, a procedure, a subroutine, a segment of a program code, a driver, a firmware, a microcode, data, databases, a data structure, a table, an array, and a variable. The software, the data, and the like can be stored in a memory, and are executed by a processor. The memory or the processor can employ various means well known to those skilled in the art.

Figure 4:
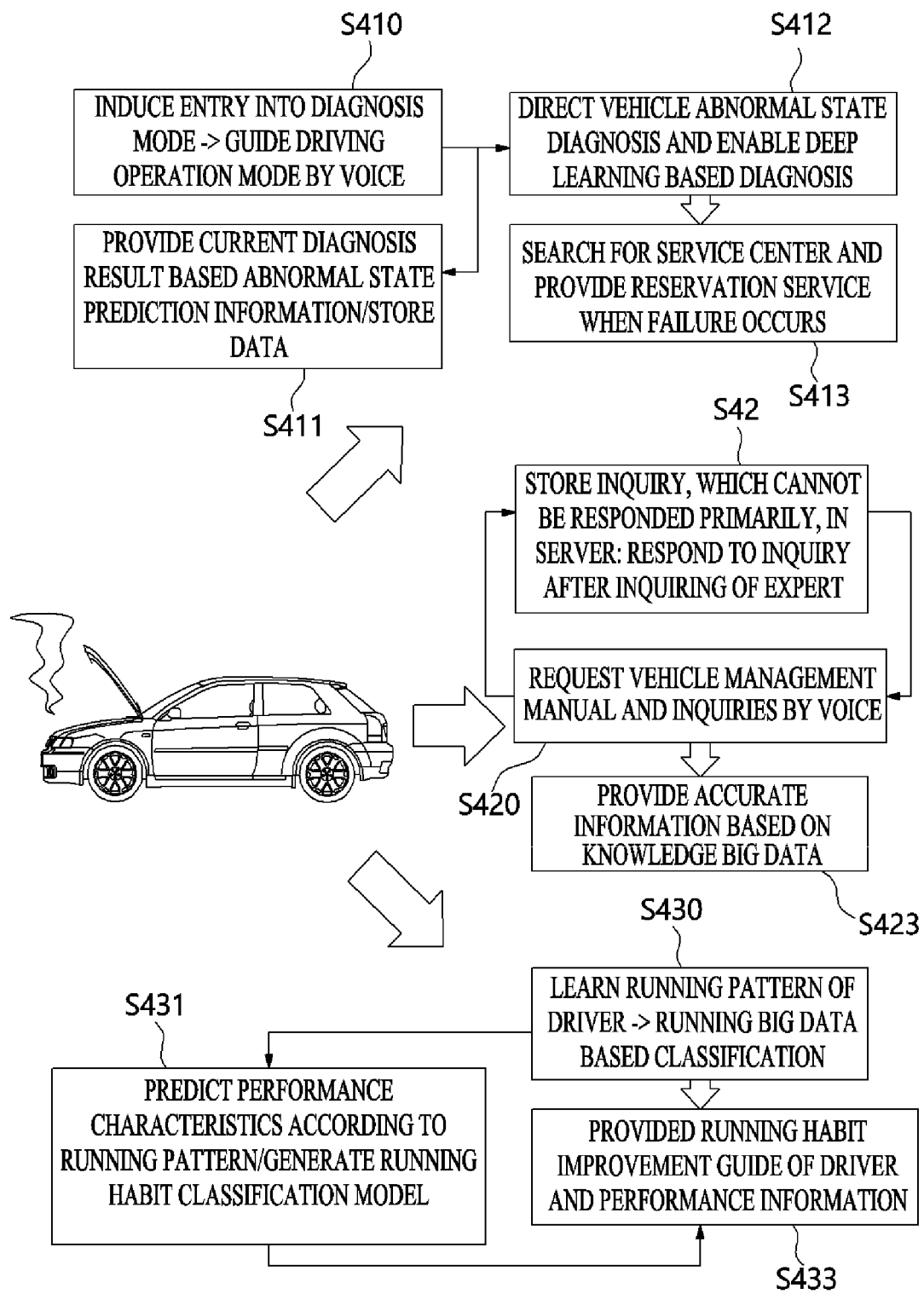
FIG. 4 is a conceptual diagram showing a processing process according to big data based state diagnosis information in one form of the present disclosure.

FIG. 4 is a conceptual diagram showing a processing process according to big data based state diagnosis information in some forms of the present disclosure. Referring to FIG. 4, when the driver requests a vehicle state check through the artificial intelligence speaker unit 130, the graphic controller 150 induces an entry into a diagnosis mode (S410). That is, when the artificial intelligence speaker unit 130 recognizes and processes the driver's instruction voice as the signal to transmit the signal to the graphic controller 150, the graphic controller 150 executes the diagnosis mode. Of course, in order to enter the diagnosis mode, the operations of some functions of the vehicle are guided by voice. Such an example is as follows.

Example 1: direct to maintain an idle state, whether to operate an air conditioner, and the like Example 2: induce an initial acceleration condition Example 3: induce a high speed running condition (reflecting a road situation)

Thereafter, the abnormal state prediction information is provided based on the current diagnosis result and the data are stored (S411). At the same time, when the diagnosis mode starts, the graphic controller 150 enables the abnormal state diagnosis instruction and the Deep Learning based diagnosis of the vehicle (S412). If a failure occurs according to the diagnosis result, the service center is searched and the reservation service is provided (S413).

That is, the graphic controller 150 searches for the service center through the central server 220 and executes the reservation service. Of course, the central server 220 can be connected in advance to a center server which manages the service center to share information with each other. Since this configuration is well known, further description thereof will be omitted.

Meanwhile, the driver requests the vehicle management manual and the technical inquiries about the vehicle by voice through the artificial intelligence speaker unit 130 (S420). Thereafter, the graphic controller 150 receives accurate information based on the knowledge big data implemented in the central server 220 to provide the accurate information to the driver through the output interface 350 and/or the artificial intelligence speaker unit 130 (S423). Of course, when there is the inquiry which cannot be responded primarily in the S420, the central server 220 can store the inquiry in the database and then allow the communication terminals 230-1 to 230-n to access the inquiry, thereby receiving the answer of the technical expert and providing the answer to the graphic controller 150 (S421).

Meanwhile, when the running pattern of the driver is acquired, the graphic controller 150 learns the running pattern of the driver to classify the driver's tendency based on the running big data (S430). The driver's tendency is classified into aggressive driving tendency, fuel efficiency-oriented driving tendency, general driving tendency, and protection-oriented driving tendency. Accordingly, guidance information and performance information for improving the running habits of the driver are provided to be in accord with to the driver's tendency (S433).

In addition, the performance characteristic according to the running pattern can be predicted, and a running habit classification model can be generated (S431).

Figure 5:
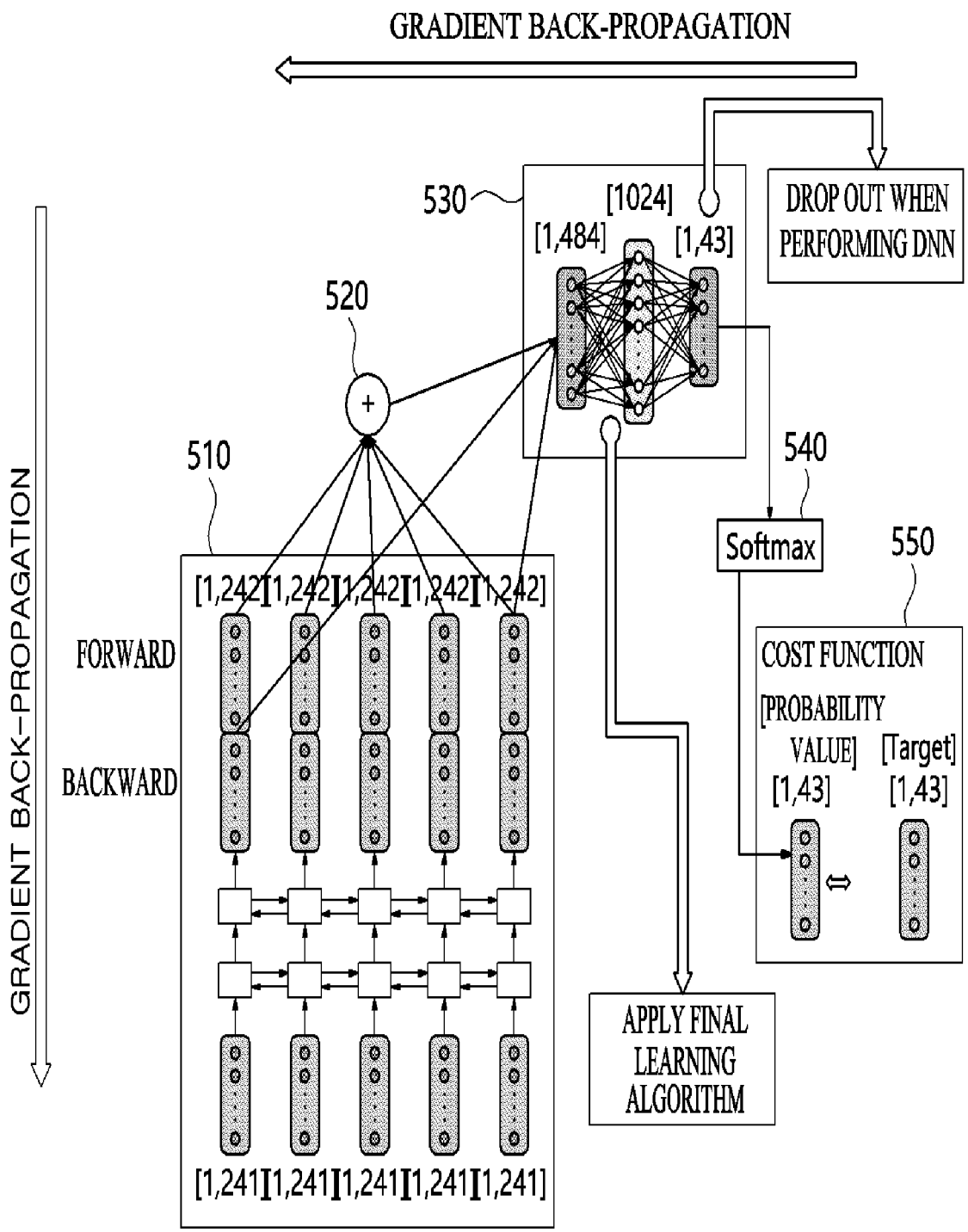
FIG. 5 is a conceptual diagram showing a Deep Learning based engine abnormal state diagnosis algorithm in one form of the present disclosure.

FIG. 5 is a conceptual diagram showing a Deep Learning based engine abnormal state diagnosis algorithm in some forms of the present disclosure. Referring to FIG. 5, in a big data alignment block 510, forward and backward attention mechanisms are applied to a node (that is, big data). After such attention mechanisms are applied, a node ($w_{att}(t)$) is weighted by a summer 520 and input to an input layer of a Deep Neural Network (DNN) block 530. Values input to the input layer by the DNN are output from an output layer, and thus a probability value is calculated from an output block 550 via a Softmax function block 540. In the output block 550, an average value (J) for all inputs is calculated. This is expressed as the following equation.

$$J(w) = -\frac{1}{N}\sum [y_n \log \hat{y}_n + (1-y_n)\log(1-\hat{y}_n)] \quad \text{Equation 1}$$

where the w refers to a weight and bias parameter, the N refers to a batch size, the $y_n$ refers to a target value, and the $\hat{y}_n$ refers to an output value.

Drop out occurs when the DNN is performed. This is applied only to the 1-layer structure, and when the epoch proceeds, it is learned by randomly cutting nodes as much as a Drop rate, thereby occurring the effect of ensembling multiple models. That is, over fitting can be prevented, thereby improving diagnosis accuracy.

[1,484] means extracting 242 node data (that is, big data) through bidirectional RNN (GRU) learning. In addition, as a result of applying the Bidirection to 121 node data, a double early stage ensemble algorithm is applied. Accordingly, 484 node information is acquired by merging 242 node information at the start time and 242 node data information at the end time.

Gradient back-propagation is an adam optimizer.

Figure 6:
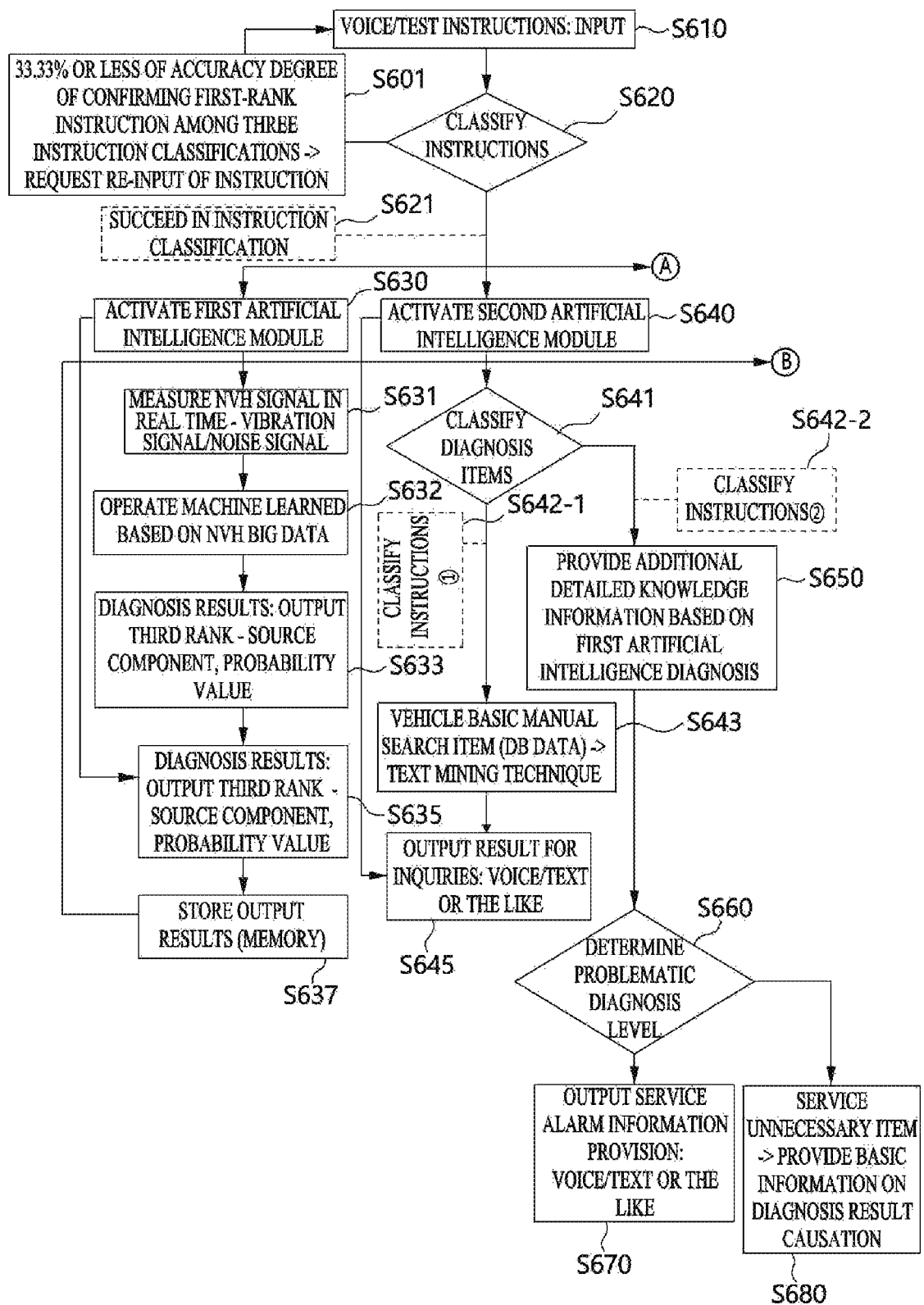
FIGS. 6 and 7 are flowcharts showing a Deep Learning based bidirectional information sharing service platform algorithm in one form of the present disclosure.
Figure 7:
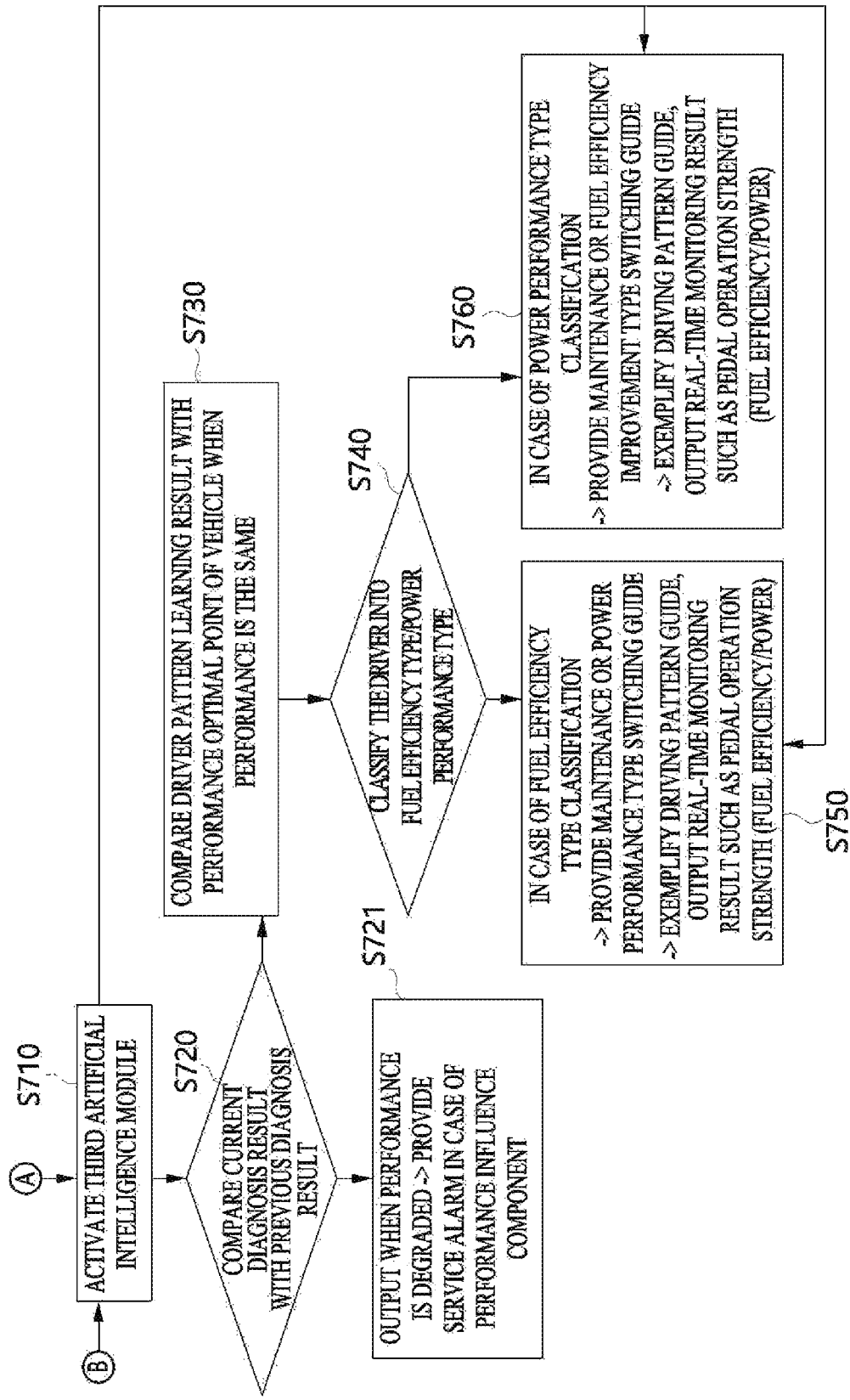

FIGS. 6 and 7 are flowcharts showing a Deep Learning based bidirectional information sharing service platform algorithm in some forms of the present disclosure. Referring to FIGS. 6 and 7, when a voice instruction is input through the artificial intelligence speaker unit 130, the graphic controller 150 classifies the diagnosis execution instruction (S610, S620). The diagnosis execution instruction can be a voice instruction or a text instruction. Of course, the voice instruction can also be converted into the text instruction and the text instruction can be input to the graphic controller 150.

When the instruction classification succeeds, the corresponding artificial intelligence module is activated (S621, S630, S710). On the contrary, when the execution instruction classification fails, the voice instruction is input again (S601, S610). That is, when the accuracy of confirming the first-rank instruction among the three instruction classifications is 33.33% or less, the guidance information of requesting the re-input of the execution instruction is provided to the driver.

Thereafter, when a first artificial intelligence module is activated, the NVH signal is measured in real time, and the machine learned based on the NVH big data is operated (S631, S632). Thereafter, when the machine is operated, that is, Deep Learning based diagnosis is performed, the source component and the abnormal probability value for the third rank of the diagnosis results are output (S633). Of course, the S631 to S633 can be omitted, and the diagnosis result output information can be output immediately after the first artificial intelligence module is activated (S635). This corresponds to the case where the big data which does not meet the criteria is very limited or the third-rank source component has an absolute abnormal probability value.

The diagnosis result output information can be stored in the memory, and activating a third artificial intelligence module can proceed.

Meanwhile, when a second artificial intelligence module is activated, the diagnosis items are classified, the basic manual search items of the vehicle are selected according to an instruction classification ①, and the result values for the inquiries about the basic manual search items can be output by voice or text (S642-1, S643, S645). Of course, the S641 to S643 can be omitted, and the S645 can also be performed immediately after the second artificial intelligence module is activated.

In the S641, the graphic controller 150 can provide additional detailed knowledge information based on the first artificial intelligence diagnosis result according to an instruction classification ② (S642-2, S650). Thereafter, the graphic controller 150 diagnoses the component having a problem and determines the levels of noise and vibration to output service alarm information provision by voice, text, or the like, or to provide basic information on the diagnosis result causation in the case of a service unnecessary item (S670, S680).

Referring to FIG. 7, when the third artificial intelligence module is activated, the current diagnosis result is compared with the past diagnosis result. If the comparison result indicates that the performance has been degraded, the service alarm is provided in the case of the performance influence component (S720, S721).

In the S720, when the performance is the same as in the past diagnosis result, the running pattern learning result of the driver is compared with the performance optimal point of the vehicle to classify whether to be a fuel efficiency type or a power performance type (S730, S740).

As a result of the classification, in the case of the fuel efficiency type classification, a maintenance or power performance type switching guide (that is, guidance information) is provided. Alternatively, the driving pattern guide is exemplified. That is, the driving pattern guide can be pedal operation strength and the like. In addition, the real-time monitoring results are output. That is, fuel efficiency, power, and the like are output (S750).

Meanwhile, as a result of the classification, in the case of the power performance type classification, the maintenance or fuel efficiency improvement type switching guide is provided (S760).

Figure 8:
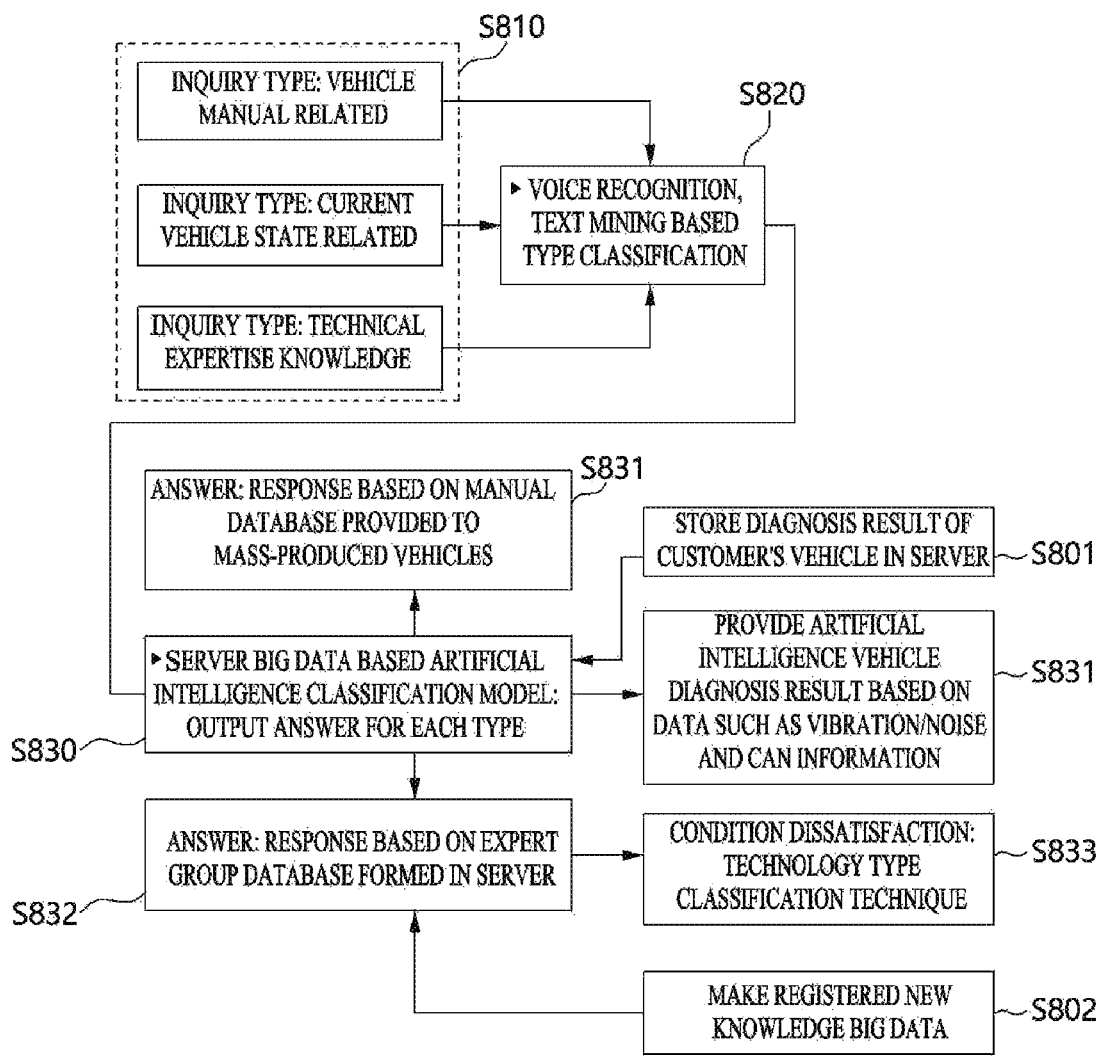
FIG. 8 is a flowchart showing a process of providing information through expertise big data and Text Mining classification in one form of the present disclosure.

FIG. 8 is a flowchart showing a process of providing information through expertise big data and Text Mining classification in some forms of the present disclosure. Referring to FIG. 8, when the driver inputs the inquiry type by voice or text, the type classification is performed based on voice recognition and/or Text Mining (S810, S820).

The central server outputs the answer for each type through the big data based artificial intelligence classification model (S830). That is, the manual database based response provided to the mass-produced vehicles is possible (S831). Of course, if there is no manual provided, the technical expert group database based response formed in the central server 220 is possible (S832). To this end, the diagnosis result information of the customer's vehicle is stored in the central server 220. The diagnosis result information can be a mileage, a diagnosis frequency, a diagnosis trend for each mileage increase, and an abnormal state prediction model of the big data based main component (S801).

In addition, data based artificial intelligence vehicle diagnosis results such as vibration/noise and CAN information are provided (S831).

In the S832, when the condition is not satisfied, the classification model period is primarily classified in consideration of the correlation between the inquiry type and the technology classification. In addition, the customer inquiry is delivered to the technical expert to register the answer in the database (S833).

New knowledge registered in the central server 220 can also become big data. Accordingly, it is possible to provide accurate knowledge to the driver, and to prevent the customer from being damaged due to abnormal knowledge shared through Internet, SNS, community, or the like (S802).

Figure 9:
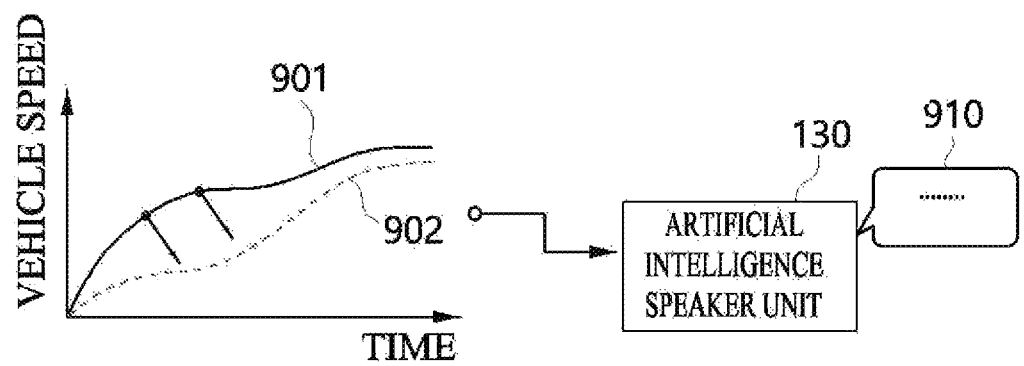
FIG. 9 is a conceptual diagram showing the provision of information based on the running pattern of a driver in one form of the present disclosure.

FIG. 9 is a conceptual diagram showing the provision of information based on a driving pattern in some forms of the present disclosure. Referring to FIG. 9, by providing the information based on the driving pattern, a current driving habit 901 is induced to a general driving pattern 902. In this case, the artificial intelligence speaker unit 130 can output guidance information, "Current acceleration is higher than the acceleration in the general running pattern. Please step on the accelerator pedal a little slowly!".

FIG. 10 is a conceptual diagram showing a process of providing guidance information by analyzing Deep Learning based driving pattern learning in some forms of the present disclosure. Referring to FIG. 10, the degree of performance influence according to the driving pattern is analyzed (S1010). That is, the degree of performance influence according to the driving pattern is classified into a degradation degree determination model and a performance correlation determination model. According to such classification, the driver's tendency can be classified into aggressive driving tendency, fuel efficiency-oriented driving tendency, general driving tendency, and protection-oriented driving tendency (S1020). In Cases 1, 2, 4, the driving habit is induced and vehicle degradation information is provided simultaneously (S1030). In a Case 3, the vehicle degradation information is provided while the current driving guide is maintained.

In addition, the steps of a method or an algorithm described in some forms of the present disclosure can be implemented in the form of program instructions which can be performed by various computer means, such as a microprocessor, a processor, or a Central Processing Unit (CPU), to be recorded on a computer-readable medium. The computer-readable medium can include a program (instruction) code, a data file, a data structure, and the like alone or in combination.

The program (instruction) code recorded on the medium can be those specially designed and configured for the present disclosure or can also be those publicly known and available to those skilled in computer software. Examples of computer-readable recording media can include magnetic media such as hard disks, floppy disks, and magnetic tapes, optical media such as CD-ROMs, DVDs, and Blu-rays, and semiconductor memory devices specifically configured to store and execute the program (instruction) code, such as ROMs, RAMs, and flash memories.

Here, examples of the program (instruction) code include not only a machine code produced by a compiler but also a high-level language code which can be executed by a computer by using an interpreter or the like. The hardware device described above can be configured to operate as one or more software modules to perform the operation of the present disclosure, and vice versa.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An information sharing platform of providing bidirectional vehicle state information between a driver and a vehicle, the information sharing platform comprising:
   a communication controller configured to collect data measured by sensors that are installed in components configured to diagnose a vehicle state and vehicle Controller Area Network (CAN) information; and
   a graphic controller configured to provide a driver with diagnosis result output information that is generated based on a predetermined selection criterion among the components through Deep Learning based diagnosis using big data having the collected measured data and CAN information;
   wherein the measured data is composed of vibration data and noise data, and the diagnosis result output information is stored to provide an abnormal prediction information; and
   wherein the diagnosis result output information includes a corresponding component and an abnormal probability value.

2. The information sharing platform of claim 1, wherein the predetermined selection criterion is set for each rank by comparing the vibration data of the measured data with noise the data of the measured data.

3. The information sharing platform of claim 1, wherein the graphic controller is configured to:
   generate driving tendency analysis information classifying the driver's tendency based on running pattern data of the driver.

4. The information sharing platform of claim 3, wherein the driving tendency analysis information classifies the driver's tendency into a fuel efficiency type or a power performance type by comparing a current diagnosis result with a previous diagnosis result.

5. The information sharing platform of claim 1, wherein the Deep Learning based diagnosis comprises:
   a bidirectional Gated Recurrent Unit (GRU), a Deep Neural Network (DNN), and an Attention mechanism.

6. The information sharing platform of claim 1, wherein the Deep Learning based diagnosis is executed when an execution instruction of the driver is input by voice or text.

7. The information sharing platform of claim 6, wherein the graphic controller comprises:
   a plurality of artificial intelligence modules, wherein the Deep Learning based diagnosis is executed based on the execution instruction.

8. The information sharing platform of claim 7, wherein the plurality of artificial intelligence modules are configured to match with the execution instruction in advance.

9. The information sharing platform of claim 7, wherein the execution instruction is re-input when the accuracy of confirming a specific-rank execution instruction among the execution instructions is equal to or less than a predetermined accuracy.

10. A big data based state diagnosis information providing system comprising:
    an information sharing platform of providing bidirectional vehicle state information between a driver and a vehicle, the information sharing platform comprising:
    a communication controller configured to collect data measured by sensors that are installed in components configured to diagnose a vehicle state and vehicle Controller Area Network (CAN) information;
    a graphic controller configured to provide a driver with diagnosis result output information that is generated based on a predetermined selection criterion among the components through Deep Learning based diagnosis using big data having the collected measured data and CAN information;
    wherein the measured data is composed of vibration data and noise data, and the diagnosis result is stored to provide an abnormal state prediction information; and
    wherein the diagnosis result output information is includes a corresponding component and an abnormal probability value; and
    a central server connected to the information sharing platform by a communication network and configured to:
    store a database; and
    provide answer information according to an inquiry type input by the driver; and
    at least one communication terminal configured to input the answer information.

11. The big data based state diagnosis information providing system of claim 10, wherein the inquiry type is at least one of vehicle manual related information, current vehicle state related information, or technical knowledge information.

12. An information sharing method of providing bidirectional vehicle state information between a driver and a vehicle, the information sharing method comprising:
    collecting, by a communication controller, data measured by sensors of components and vehicle Controller Area Network (CAN) information;
    executing, by a graphic controller, Deep Learning based diagnosis using big data composed of the collected measured data and CAN information; and providing, by the graphic controller, a driver with diagnosis result output information generated by a predetermined selection criterion among the components by executing the Deep Learning based diagnosis;

wherein the measured data is composed of vibration data and noise data, and the diagnosis result is stored to provide an abnormal state prediction information; and wherein the diagnosis result output information includes a corresponding component and an abnormal probability value.

13. The information sharing method of claim 12, wherein the method further comprises:

generating, by the graphic controller, driving tendency analysis information classifying the driver's tendency based on running pattern data of the driver.

14. The information sharing method of claim 13, wherein the generation of the driving tendency analysis information includes:

classifying, by using the driving tendency analysis information, the driver's tendency into a fuel efficiency type or a power performance type by comparing a current diagnosis result with a previous diagnosis result.

15. The information sharing method of claim 12, wherein the Deep Learning based diagnosis comprises:

a bidirectional Gated Recurrent Unit (GRU), a Deep Neural Network (DNN), and an Attention mechanism.

16. The information sharing method of claim 12, wherein the execution of the Deep Learning based diagnosis includes:

executing, by the graphic controller, the Deep Learning based diagnosis when an execution instruction of the driver is input by voice or text.

17. The information sharing method of claim 16, wherein the execution of the Deep Learning based diagnosis includes:

executing, by the graphic controller, the Deep based Learning diagnosis based on the execution instruction, wherein the graphic controller comprises a plurality of artificial intelligence modules.

18. The information sharing method of claim 17, where in the method comprises:

matching, by the plurality of artificial intelligence modules, the execution instruction in advance.

* * * * *